Feb. 18, 1964

A. S. PARKER 3,121,611

PROCESS FOR THE PRODUCTION OF OXYGEN

Filed May 10, 1960

INVENTOR.

*Almon S. Parker.*

Feb. 18, 1964

A. S. PARKER 3,121,611

PROCESS FOR THE PRODUCTION OF OXYGEN

Filed May 10, 1960

INVENTOR.

*Almon S. Parker.*

3,121,611
PROCESS FOR THE PRODUCTION OF OXYGEN
Almon S. Parker, Chester County, Pa.
(796 Trephanny Lane, Wayne, Pa.)
Filed May 10, 1960, Ser. No. 28,139
10 Claims. (Cl. 23—221)

This invention concerns a new chemical process, specifically a new method for the production of oxygen and in particular a method for the production of oxygen by chemical means which is more economical than processes presently used.

Practically all of the oxygen produced commercially at the present time is manufactured by the distillation of liquid air. The various liquid air processes have certain inherent disadvantages. The plants are expensive to build and maintain, and they require large amounts of power for compression and refrigeration. Also, certain hazards are involved in operation. The trace amounts of acetylene in the atmosphere tend to accumulate in the process and great care must be exercised to avoid disastrous explosions. The oxygen product itself, as a liquid or as a high pressure gas, is potentially a very dangerous material if it leaks from equipment or piping. Some very severe explosions have resulted from such leakage. There is therefore a real need for a process and plant which can produce oxygen cheaply and safely with a minimum amount of equipment.

Air liquefaction plants were first introduced around the turn of the century. Before that time oxygen had been made industrially by the use of chemical intermediates. One of the most highly developed of these chemical processes was that known as the Brin process. In the Brin process barium oxide is heated in air absorbing oxygen therefrom to form barium peroxide. The barium peroxide when heated to a higher temperature, or preferably subjected to vacuum, releases the absorbed oxygen and regenerates the barium oxide.

The energy requirements and the large inventory of solids necessary for cyclic operation in processes of this type made them uneconomic compared with air liquefaction and they have been generally abandoned.

Another chemical process, developed in the nineteenth century by Tessie du Motay, was based on the decomposition of sodium manganate with steam as indicated by the following equation:

$$Na_2MnO_4 + H_2O \rightleftarrows 2NaOH + \tfrac{1}{2}O_2 + MnO_2$$

This process is described in United States Patent No. 70,705 to Du Motay and Marechal.

In the Du Motay process a fixed bed of sodium manganate, which had been prepared in a special manner, was alternately treated at approximately constant temperature, with steam to release oxygen and then with air to regenerate the sodium manganate.

This process also was uneconomic compared with air liquefaction not only because of the necessarily large inventory of solids but because the quantity of steam required was much greater than that predicted by the chemical equation.

In recent years there have been a number of attempts to again arouse interest in the chemical production of oxygen. A considerable amount of work was done on the older processes and some new ones were also developed. While several of these chemical oxygen processes have been successful technically, none has yet been able to compete with the liquid air processes on a cost basis.

There are a great many materials which have the ability to release oxygen when heated. A number of these will also reabsorb oxygen from the air at a lower temperature. The materials which exhibit this reversible absorption and desorption of oxygen are mostly metal oxides but include some other inorganic compounds and a number of organic compounds as well. Some of the materials are eliminated from consideration as intermediates for chemical oxygen production because they are very expensive, mechanically or chemically unstable, or they require impractically high operating temperatures. Of those remaining, most of the effort to develop a chemical oxygen process has been concentrated on five compounds. These are barium peroxide, chromium trioxide, manganese dioxide, copper oxychloride and sodium manganate. Sodium manganate is a special case and will be discussed later.

One of the major difficulties with the so-called oxide type of process is that the desorption of oxygen must take place at substantially higher temperature than the absorption from the air unless the desorption is carried out under a vacuum or the absorption is carried out under pressure. Pressure absorption followed by vacuum desorption has also been used, as for example, in the Brin barium peroxide process.

This required temperature or pressure differential between absorption and desorption is characteristic of the compounds being used. When one of these compounds such as manganese dioxide ($MnO_2$) is heated it tends to decompose, releasing oxygen and forming a lower oxide ($Mn_2O_3$). To show this tendency the manganese dioxide exerts a partial pressure of oxygen, often referred to as the dissociation pressure. As the temperature is increased the dissociation pressure rises very rapidly. However, the decomposition reaction will not actually proceed until a temperature is reached at which the dissociation (equilibrium) pressure exceeds the partial pressure of oxygen in the gas phase of the system. If the equilibrium pressure (and corresponding temperature) is lower than the oxygen partial pressure in the gas, any manganic oxide ($Mn_2O_3$) present in the system will absorb oxygen from the gas, regenerating manganese dioxide.

Theoretically the equilibrium partial pressure of oxygen is a function of temperature only. A thermodynamic analysis of the chemical reaction results in the Clapeyron equation which expresses the relationship between dissociation pressure and temperature and indicates that the logarithm of the pressure should be plotted against the reciprocal of the absolute temperature for correlation. The slope of the line so plotted is proportional to the heat of reaction per mole of oxygen.

Handling the data on various samples of a given compound (e.g. $MnO_2$) in this manner results in a series of essentially parallel lines, one line for each sample, which lines are nearly straight over wide ranges of pressure. The displacement of the lines is a function of particle size, method of sample preparation, and in some cases the previous treatment of the sample.

In absorbing oxygen from the air the temperature must be so chosen that the equilibrium partial pressure of oxygen is lower than the oxygen partial pressure in the inlet air. Conversely, in desorption the temperature must be equivalent to an equilibrium oxygen partial pressure higher than the oxygen partial pressure in the product gas. If the product gas is pure oxygen and the absorption and desorption are both carried out at the same pressure (usually atmospheric), the desorption temperature must normally be 200° F. to 400° F. higher than the absorption temperature. On the other hand, if the absorption and desorption are both at the same temperature, the absolute pressure during absorption must be about 15–30 times that during desorption.

In addition to the problem of the required temperature or pressure differential, the reaction by which oxygen is produced is endothermic while that by which it is absorbed from the air is exothermic. Therefore, in order to maintain the temperature during absorption the exothermic heat of reaction must be removed, and to maintain the temperature during desorption the endothermic heat of reaction must be provided. These two amounts of heat are numerically equal and quite large, but the exothermic heat of absorption cannot normally be used for the desorption because the desorption temperature is either the same or higher than the absorption temperature. In fact, when the desorption temperature is higher than the absorption temperature, further quantities of heat beyond the heats of reaction must be added to and removed from the system as a whole to maintain the temperature difference. If the desorption temperature is lower than the absorption temperature, the required pressure differential will be at least twice that noted above and the additional energy requirement more than compensates for the fact that the heat of absorption may be used in the desorption step of the process.

The large amounts of energy necessary to produce and maintain the required temperature or pressure differentials described above result in a process which cannot compete with the liquid air processes.

There is a considerable thermal advantage in operating the absorption and desorption steps of the oxide type process at the same temperature. The accompanying necessity for pressure absorption and, or vacuum desorption can be avoided by using an inert gas in the desorption step to reduce the partial pressure of oxygen in the product gas from the desorption reaction zone. The inert gas should be one which may be easily separated from the product oxygen. A preferred inert gas is steam, although in special cases other gases may be necessary or desirable. Such special cases will usually arise when the steam is not inert toward the chemical intermediate being used. In the barium peroxide process, for example, steam would react with the barium oxides to form barium hydroxide which will not absorb or desorb oxygen.

The quantity of steam (inert gas) required per unit of oxygen production is determined by the conditions of operation. If the absorption from air is carried out at atmospheric pressure and the desorption is also operated at atmospheric pressure and the same temperature, the theoretical minimum steam reqiurement is 2.12 lbs. per lb. of oxygen. The actual steam requirement is two to five times this amount and again results in a process which cannot compete with the liquid air processes. Variations in the operating conditions to reduce steam consumption do not improve the economics because the savings in steam consumption are covered by equivalent or even greater increases in other energy requirements.

Among the numerous materials which have the ability to release oxygen on heating are the manganates, particularly the alkali manganates. It has been reported, for example, that potassium manganate is decomposed on heating to potassium permanganite and oxygen according to the equation:

$$K_2MnO_4 = K_2MnO_3 + \tfrac{1}{2}O_2$$

cf. J. W. Mellor, "A Comprehensive Treatise on Inorganic and Theoretical Chemistry," vol. 12, p. 285 (1932). A plot of the logarithm of the dissociation pressure of potassium manganate versus the reciprocal of the absolute temperature results in a line which is nearly straight over a 50 fold range of pressure and is very similar to the lines given by the oxide type oxygen producing compounds such as manganese dioxide which have been referred to previously.

The alkali manganates are also supposed to be able to produce oxygen by the Du Motay steam decomposition process as indicated by the equation:

$$Na_2MoO_4 + H_2O = 2NaOH + MnO_2 + \tfrac{1}{2}O_2$$

In all of the rather extensive investigations of the Du Motay process, this reaction has been taken to illustrate the general mechanism by which oxygen is produced. Because of this it was not thought that the oxygen absorption and desorption steps of the process required different temperature levels and a great deal of the effort was directed toward finding a catalyst or other additive for the manganate formulations which would improve the yield of oxygen.

There is considerable doubt that the reaction for producing oxygen ascribed to the Du Motay process actually takes place although the reverse reaction is well known. It seems much more likely that the manganates are thermally decomposed to manganites and oxygen, and any steam introduced merely serves as an inert gas to carry off the evolved oxygen. There are three reasons for this conclusion.

(1) In the Du Motay plants, the steam consumption was four to ten times the amount predicted by the chemical equation (theoretical steam—1.126 lbs./lb. of oxygen). This amount is in general agreement with that required in true oxide type processes where the steam is known to be inert toward the chemicals involved.

(2) Equilibrium studies of the system $$Na_2MnO_4 - H_2O - NaOH - MnO_2 - O_2$$

have shown that the partial pressure of steam has little if any effect on the observed equilibria.

(3) Small scale experiments, in which steam and air were alternately passed over various alkali manganate formulations, have shown no evidence of steam consumption during steaming or of steam production during aeration.

Therefore, the manganates are regarded as oxide type oxygen producing compounds and the factors described previously, which are involved in the use of the oxide type materials (e.g. $MnO_2$) to produce oxygen, also apply to the manganates.

Up to this point the discussion of chemical oxygen production has been concerned with fixed bed operations in which the oxygen producing compounds are alternately exposed to absorption and desorption conditions in a continuing cycle. The possibility of applying the fluidized solids technique to chemical oxygen production has been considered and a substantial effort was made to apply this technique to the manganese dioxide process.

It was hoped that the properties of a fluidized bed which make it advantageous in other applications would permit its successful utilization here. One of the outstanding characteristics of a fluidized bed is that nearly perfect mixing is obtained. Because of this the composition of the solids and gases at every point in the bed is substantially constant. Also the composition of the gas leaving the bed is essentially the same as that within the bed. If the reactions in the fluidized bed evolve or absorb heat, heat may be removed from or added to the bed by means well known in the art to maintain the temperature level. Under these conditions, because of the nearly perfect mixing, the temperature as well as the composition at every point in the bed is practically constant.

In an oxide type of chemical oxygen process the operating conditions imposed by the characteristics of the oxygen producing compound itself apply to both fixed bed and fluid bed operation. These include such major factors as the requirement for a temperature or pressure differential between absorption and desorption; the necessity to both provide the heat of desorption and remove the heat of absorption by external means; the need to add and remove further quantities of heat to maintain the temperature differential; and the necessity to use steam (inert gas) in the desorption step to avoid the pressure differential.

Therefore the only advantages of a fluidized bed over a fixed bed for the process lie in the lower construction cost and in the excellent control over process variables such as temperature and composition which is characteristic of fluid bed operation. Also, because the solids may be easily transferred from one fluidized bed to another for absorption and desorption, the process need not be operated cyclically, thus making the process piping less complicated and tending to reduce the required inventory of oxygen producing compound (e.g. $MnO_2$).

The advantages of the fluidized bed are not great enough to overcome the large steam (inert gas) and other energy requirements inherent in the oxide type of chemical oxygen process. Consequently, the application of this technique to the process still fails to result in a process which can compete with the liquid air processes.

In the foregoing discussion, the state of the art of chemical oxygen production has been outlined.

I have discovered that oxygen can be produced economically by chemical means using a combination of techniques which avoids the enormous expenditures of energy in the form of fuel, steam, or power required by other processes whether chemical or physical in nature. In its broad aspect my invention consists of a process for the manufacture of oxygen which comprises bringing a stream of an oxygen containing material, selected from the group of oxygen containing materials having the ability to release oxygen when heated and reabsorb it from air at a lower temperature, into countercurrent contact with an inert gas at about the temperature at which the material would release oxygen into air at atmospheric pressure. Following the release of oxygen the material is brought into countercurrent contact with air to regenerate the original oxygen containing material. The exothermic heat of regeneration is used to provide the endothermic heat of reaction (oxygen release) by restricting the extent of reaction, letting the partially reduced material provide the heat of reaction by giving up sensible heat and falling in temperature, and then subjecting the cooler material to regeneration during which it absorbs the heat of regeneration as sensible heat and rises in temperature to the original level.

In the discussion and description of my invention which follow, manganese dioxide is indicated as the oxygen producing compound used in the process. While manganese dioxide is a preferred material, the techniques I have developed may be applied to any liquid or solid material which has the ability to release oxygen when heated and reabsorb it from air at a lower temperature, provided only that the materials do not react with steam under the required operating conditions and that solid materials have physical properties which permit handling in the fluidized state. The steam functions as an inert gas and is a preferred material for this purpose, but if it is necessary or desirable to use a gas other than steam, such gas must be inert toward both the oxygen producing material and oxygen itself. Liquid oxygen producing materials may be in the form of pure liquids, solutions, fluidizable suspensions of solids in liquids, or combinations of these. Mixtures containing more than one liquid phase may also be handled. It will be clear to those skilled in the art that there is an obvious parallel between liquids and fluidized solids in the general design of apparatus to handle them during the course of the required reactions.

In a preferred embodiment of my invention, oxygen is made by a process which comprises flowing finely divided manganese dioxide through a reaction zone countercurrently to a stream of steam. The temperature in the reaction zone is between about 600° F. and about 1200° F. and the pressure is substantially atmospheric. The pressure may be higher or lower than atmospheric if desired.

Manganese dioxide releases oxygen according to the reversible reaction:

$$2MnO_2 \rightleftharpoons Mn_2O_3 + \tfrac{1}{2}O_2$$

In air (partial pressure of oxygen=0.21 atm.) the reaction proceeds to the right at temperatures between about 500° F. and about 1100° F. depending upon the method of preparation and extent of subdivision of the manganese dioxide used.

Following release of oxygen to the extent desired, the manganese oxides are conveyed from the reaction zone to a regeneration zone through which they are passed countercurrently to a stream of air. Manganese dioxide is regenerated by absorption of oxygen from the air. The temperature in the regeneration zone is approximately the same as that in the reaction zone. The pressure is also approximately the same although it may be higher if desired.

Preferably the contact of the solids with the gases, both steam and air, is made while the solids flow in a discontinuous stream. The discontinuous stream may be formed by moving the solids through a plurality of fluidized beds in series or by cascading the solids downward over a series of baffles.

The use of a discontinuous solids stream flowing countercurrently to the gases is particularly advantageous in this process because of the extreme necessity to maintain uniform, homogeneous, and controlled contacting conditions. It is difficult to design and operate apparatus handling continuous solids streams (e.g. "rainfall" reactors or moving bed reactors) so as to prevent channeling or other malfunctions which reduce the efficiency of gas-solids contact. To the extent that these difficulties may be overcome, such apparatus may be used in the process as well as the recommended type.

As indicated previously, the reaction by which manganese dioxide produces oxygen is quite strongly endothermic. Between 1000 and 2000 B.t.u. per pound of oxygen produced must be provided to maintain the reaction temperature. Conversely, in the reverse reaction the same amount of heat must be removed to maintain the regeneration temperature.

It would be advantageous if the exothermic heat of regeneration could be used to provide the endothermic heat of the oxygen producing reaction. I have found that this can be done quite simply by causing the temperature of the solids to fall a controlled amount as they pass through the reaction zone and to rise an equal amount as they pass through the regeneration zone. This controlled temperature change is brought about by limiting the extent of reaction so that, in producing oxygen, only a small fraction of the manganese dioxide is consumed. Then, if no heat is added, the remaining manganese dioxide and the manganic oxide ($Mn_2O_3$) formed provide the required heat of reaction by giving up sensible heat and falling in temperature. The resulting cooler solids, when subjected to regeneration with no heat removal, absorb the heat of regeneration as sensible heat and rise in temperature. At the completion of regeneration, the temperature rise is substantially equal to the fall which occurred during reaction and the cycle may be repeated continuously.

The size of the temperature change and the corresponding extent of reaction permitted in the reaction zone is primarily determined by the relationship between the equilibrium partial pressure of oxygen in contact with the manganese oxides, the operating pressure, the steam to oxygen product ratio, and the number of reaction gas-solids contacting steps required. The permissible temperature change is also related to the operating pressure in the regeneration zone, the efficiency of oxygen recovery from the air, and the number of regeneration gas-solids contacting steps required.

Theoretically, the equilibrium partial pressure of oxygen is a function of temperature only and is not influenced by the extent of reaction as long as some manganese dioxide is still present in the system. This has been verified experimentally by a number of investigators for various samples of manganese dioxide. However, there is considerable variation between individual samples. This variation is a function of the particle size and the method of sample preparation, but does not depend on temperature.

In designing equipment to operate according to this invention, the unique relationship among the variables affecting operation may be conveniently worked out by the method described below. Other methods are possible and it is likely that they may occur to those skilled in the art. Since the result is unique, these other methods are considered to be within the scope of the invention.

The apparatus containing the reaction zone will be referred to as the reactor and that containing the regeneration zone will be called the regenerator. The same type of apparatus can be used for both reactor and regenerator. Various designs are possible. In one preferred arrangement a series of shallow fluidized beds are set up one above the other in a column. The solids flow down from one bed to the next by means of overflow weirs and downcomers while the gases are passed up through the beds one after another. In another arrangement the solids flow downwardly over a series of inclined baffle plates mounted in a tower, while the gases are blown upwardly through the tower. The plates may or may not be perforated.

The first step in design is to choose the operating pressure in the regenerator (gas inlet) and in the reactor (gas outlet). The values chosen are not critical in themselves since both reactor and regenerator can be operated over a rather wide range of pressures. However, the effect of pressure on the other variables in the process and on the overall economics limits the choice rather closely. In general, the economics of the process dictate that both pressures be low, approaching atmospheric. Since the gas fed to the regenerator is air, the pressure at the inlet (bottom) determines the partial pressure of oxygen at that point.

The second step is to choose a value for the steam-oxygen product ratio in the gas outlet (top) of the reactor. This value, combined with the pressure, determines the partial pressure of oxygen in the gas leaving the top of the reactor. The steam-oxygen ratio chosen, while minimum values are desirable, must be high enough so that the oxygen partial pressure at the top of the reactor will be lower than that at the bottom of the regenerator. Otherwise there will be no driving force to move the oxygen from the air through the manganese dioxide into the steam from which it can be collected as product.

The third step is to choose the equilibrium partial pressure of oxygen over manganese dioxide at the bottom of the regenerator which in turn determines the temperature at that point. As indicated previously, the temperature may vary widely among the samples of manganese dioxide used. Typically however, it will be between about 600° F. and about 1200° F.

The value of the equilibrium oxygen partial pressure chosen is lower than the oxygen partial pressure at the bottom of the regenerator and higher than that at the top of the reactor. The ratio of the two partial pressure differences or driving forces obtained by this procedure can be varied considerably. The ultimate choice is determined by the operability of the reactor and by an economic balance among the various factors involved.

The fourth step in design is to choose the range of the temperature cycle that the circulating solids go through in absorbing the exothermic heat of regeneration and evolving the endothermic heat of reaction. The range chosen is critically influenced by the shape of the equilibrium curve (partial pressure of oxygen vs. temperature) for the particular sample of manganese dioxide being used. This will become clear as the design method develops further. Normally the temperature range will be 50° F. to 70° F. Therefore, the temperature at the bottom of the reactor will be 50° F. to 70° F. lower than the temperature at the bottom of the regenerator.

The fifth step is to calculate the reaction heat load for some oxygen production rate. Then, for the temperature range chosen in step four, calculate the solids circulation rate required. The ratio of oxygen production rate to solids circulation rate may be expressed in any convenient concentration units. The difference between this ratio and zero represents the concentration effect in the solids caused by the absorption or desorption of oxygen in the specified temperature range. The relation between absorbed oxygen concentration in the solids and the temperature is substantially a straight line. By combining this relation with the equilibrium curve (not a straight line) and the total pressure, it is possible to construct a curve showing the variation in the equilibrium concentration of oxygen in the gas as a function of the concentration in the solids.

Because of the nature of the pressure-temperature curve (similar to a vapor pressure curve), the final equilibrium (concentration) curve is concave upward in shape. If the pressure or pressure distribution in the reactor is different from that in the regenerator, separate equilibrium curves are required for each vessel.

In the case of the reactor, enough information is now available to determine by well understood methods (e.g. the graphical method) the number of equilibrium gas-solids contacting steps (theoretical plates) required to desorb oxygen from the solids to the extent specified. If the temperature range chosen in step four above is too wide, the operating line (graphical method) will pass tangent to the equilibrium curve or intersect it rather than lie below it at all points as it should. The condition of intersection is absolutely inoperable and the condition of tangency requires an infinite number of theoretical plates. As the chosen temperature range is narrowed, the solids circulation rate increases and the number of theoretical plates decreases. However, narrower temperature ranges decrease the efficiency of oxygen recovery from the air during regeneration. As before, the ultimate choice is determined by an economic balance.

For the regenerator, if the efficiency of oxygen recovery from the air is chosen, enough information is then available to determine, by the same methods as for the reactor, the number of theoretical plates required to absorb oxygen into the solids to the extent specified. In this case the operating line lies above the equilibrium line. However, if the efficiency of oxygen recovery from the air is chosen at too high a value, the operating line will intersect the equilibrium curve resulting in an inoperable condition. The efficiency must be low enough to give an economical number of plates and is normally between 50% and 60%. Attempts to increase the efficiency of oxygen recovery result in very rapid increases in the steam requirements of the reactor and corresponding increases in the cost of the product oxygen.

In order to maintain the heat balances which have been established, the temperature of the steam entering the reactor is made the same as that of the steam-oxygen mixture leaving, and the temperature of the air entering the regenerator is made the same as that of the nitrogen leaving. While other temperature levels for the inlet air and steam are permissible, the overall heat balance must be preserved. If the air temperature is low, the steam temperature must be correspondingly higher and vice versa.

This completes the description of one method of determining the unique relationship among the variable affecting operation of the oxygen process. It should be reemphasized that in most cases the choice of operating conditions is determined primarily by economics rather than by technical considerations.

Normally, in passing through the reactor, only about ten percent of the manganese dioxide is converted. The remainder serves as a heat carrier to maintain the required temperature limits. If desired, any or all of the non-reacting portion of the manganese dioxide may be replaced with an inert material. Sand ($SiO_2$), alumina ($Al_2O_3$) and mill scale ($Fe_3O_4$) are representative of the suitable materials which may be used as heat carriers.

Ordinarily, the active agent ($MnO_2$) and the inert material are used as a simple mechanical mixture. With some of the active agents which may be used in the process, inert materials are not only desirable but necessary. In addition to carrying heat, such materials may serve to dilute and, or chemically stabilize the active agent, or act as mechanical carriers for active agents which tend to agglomerate or pass through phase changes during reaction.

The particle size of the solids circulating in the system should be in the ranges usually encountered in fluidized solids handling. Normally this is between about 48 and about 400 mesh (Tyler).

The reaction time of the solids ($MnO_2$ and $Mn_2O_3$) is not an important factor in the process. Reaction time is influenced by temperature, particle size, extent of reaction and other variables. However, the temperature levels required to give the necessary equilibrium partial pressures of oxygen are high enough so that the reaction rates are rapid and, with the small particle size and limited extent of reaction used, the required reaction times are short. More than the required time is inherent in the design of the normally preferred apparatus (series of fluidized beds) for carrying out the process. This built-in contact time is usually between two and five minutes for both reactor and regenerator, and can be increased if desired.

During the countercurrent contacting of solids and gases in the reactor and regenerator, some of the solids are entrained in the gases leaving overhead. This is typical of fluidized solids-gas contacting systems and often presents problems which are expensive to solve. A subsidiary feature of the present invention lies in an advantageous means for removing the entrained solids from the gases leaving the reactor and regenerator. In accordance with this feature water is sprayed directly into the gases. The water, while cooling the gases, scrubs out the entrained solids and removes them as a slurry. The solids in the slurry are recovered by filtration or other suitable means and returned to the reactor-regenerator system. If all or a part of the solids are soluble in water, the water used in the spraying operation is recycled until it is saturated with dissolved solids and the saturated solution is used in place of fresh water for the gas cooling and solids recovery. A number of variations are possible in applying this feature and the choice is likely to be governed largely by cost considerations.

The invention will be further described with reference to the drawings in which.

Figure 1:
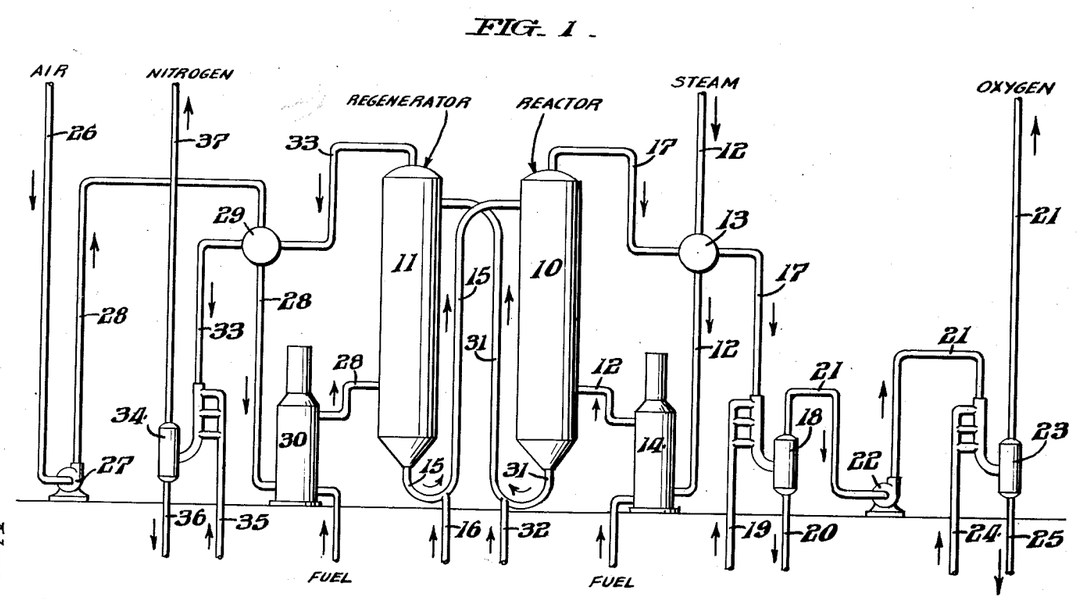
FIG. 1 is a schematic flow diagram showing a process according to the invention.

Referring to FIG. 1, the system illustrated there is suitable for large scale production of oxygen according to the invention. The system comprises a reactor 10 and a regenerator 11. Designs for the reactor and regenerator will be described later. Steam for the reactor is introduced into the system through a line 12. The line 12 passes through a heat exchanger 13 and then to a fired heater 14. From the fired heater line 12 discharges into the bottom of the reactor 10. Regenerated solids are removed from the bottom of regenerator 11 through a line 15. In line 15 the solids are conveyed to the top of reactor 10 by means of steam used as a carrying gas and introduced through a line 16. Alternatively means may be provided for separating the carrying steam and solids, introducing the solids to the top of the reactor and the steam to the bottom. Also, product oxygen may be substituted for steam as a carrying gas.

Steam and product oxygen leave the top of reactor 10 through a line 17. A cyclone separator (not shown) is provided at the gas outlet of the reactor to recover entrained solids in the gas stream flowing through line 17, returning them to the reactor. The line 17 passes through the heat exchanger 13 and discharges into a spray cooler 18. The spray cooler comprises an inlet pipe, containing a series of spray nozzles, connected to a simple tank-type separator. Other designs are possible and may be used if desired. A line 19 is provided for feeding water to the spray nozzles of the cooler 18. The line 19 has a series of branches to serve the various spray nozzles. Water is removed from the separator of spray cooler 18 through a line 20. The water flowing in line 20 carries suspended all of the solids still entrained in the gas leaving the cyclone separator at the outlet of the reactor 10.

The product oxygen leaves the separator of spray cooler 18 through a line 21. The line 21 contains an oxygen compressor 22 and an oxygen aftercooler 23. The oxygen compressor 22 may be of any standard design suitable to the pressure at which the product oxygen is desired. The oxygen aftercooler 23 is shown on the drawing as a spray cooler of the same design as cooler 18. It also may be of any suitable design desired. Lines 24 and 25 are provided for introducing and removing water from aftercooler 23.

Air for the regeneration side of the system is introduced through a line 26 to a blower 27. The air is discharged from the blower 27 through a line 28. The line 28 passes through a heat exchanger 29 and then through a fired heater 30, finally discharging into the bottom of the regenerator 11. Reacted solids are removed from the bottom of reactor 10 through a line 31. In line 31 the solids are conveyed to the top of regenerator 11 by means of steam used as a carrying gas and introduced through a line 32. Air may be substituted for steam as a carrying gas. In such a case, means may be provided for separating the carrying air and solids, introducing the solids to the top of the regenerator and the air to the bottom.

Nitrogen (includes unreacted oxygen) leaves the top of regenerator 11 through a line 33. A cyclone separator (not shown) is provided at the gas outlet of the regenerator to recover entrained solids in the gas stream flowing through line 33, returning them to the regenerator. The line 33 passes through the heat exchanger 29 and discharges into a spray cooler 34. The spray cooler comprises an inlet pipe, containing a series of spray nozzles, connected to a simple tank-type separator. Other suitable designs may be used if desired. A line 35 is provided for feeding water to the spray nozzles of the cooler 34. The line 35 has a series of branches to serve the various spray nozzles. Water is removed from the separator of spray cooler 34 through a line 36. The water flowing in line 36 carries suspended all of the solids still entrained in the gas leaving the cyclone separator at the outlet of the regenerator 11. The nitrogen leaves the separator of spray cooler 34 through a line 37 which discharges to the atmosphere.

The recovery of solids from the water flowing in lines 20 and 36, and the return of these recovered solids to the reactor-regenerator system are not shown in the drawing. The line 20 empties into a pump which in turn discharges into the line 35. In this way the water flowing in line 36 carries the entrained solids from the reactor 10 along with those from the regenerator 11. The line 36 conducts the slurry of solids in water to a filter of suitable conventional design which separates the solids from the water. The solids leaving the filter are returned to the hot solids circulation system of the reactor-regenerator by pneumatic transport or other suitable means. Various alternatives will suggest themselves to those skilled in the art and may be used if desired.

In operation steam, introduced through line 12, is heated by means of hot steam-oxygen in heat exchanger 13 and is further heated in fired heater 14 to a temperature between about 600° F. and about 1200° F. The preheated steam is fed to the bottom of reactor 10. Regenerated solid material (manganese dioxide) leaving the bottom of regenerator 11 in line 15 is picked up by steam, introduced through line 16, and conveyed to the top of reactor 10. The steam used for carrying may be separated from the solids and sent to the bottom of the reactor 10. Also, the carrying steam may comprise a portion of the preheated steam leaving the fired heater 14, or product oxygen may be substituted for steam as the carrying gas. None of these three alternatives is shown in the drawing.

In the reactor 10 the solids move downwardly, preferably as a discontinuous stream, and are met with a rising stream of steam. Because the partial pressure of oxygen in the steam is lower than the equilibrium partial pressure of oxygen over manganese dioxide, a portion of the manganese dioxide reacts to form manganic oxide and oxygen. The oxygen produced is carried off in the stream of steam. As the solids move down through the reactor and the reaction progresses, the endothermic heat of reaction causes the solids temperature to decrease by about 50° F. to 70° F.

The steam and product oxygen are removed from the reactor 10 and its cyclone separator (not shown) through line 17 and, after serving to heat fresh steam in heat exchanger 13, are delivered to the spray cooler 18. In the spray cooler 18 the oxygen-steam mixture is contacted with water introduced from line 19 through a series of spray nozzles. The temperature of the mixture is thereby reduced to a level between 100° F. and 200° F. At the same time most of the steam is condensed and the solids remaining entrained in the entering gas stream are removed forming a thin slurry with the water. The slurry is removed from the cooler 18 through line 20.

Oxygen is removed from the spray cooler 18 through line 21, is compressed in compressor 22, cooled in cooler 23 and may then be disposed of as desired.

In order to regenerate the solids following their reaction in reactor 10, air is drawn through line 26 into blower 27 which sends it via line 28 through heat exchanger 29 and fired heater 30 to the bottom of the regenerator 11. In heat exchanger 29 the air is heated by means of hot nitrogen and in the fired heater 30 it is further heated to a temperature between about 550° F. and about 1150° F. Reacted solid material (manganese dioxide and manganic oxide) leaving the bottom of reactor 10 in line 31 is picked up by steam, introduced through line 32, and conveyed to the top of regenerator 11. Air may be substituted for steam as the carrying gas, in which case the carrying air may be separated from the solids and sent to the bottom of the regenerator. Also, the carrying air may comprise a portion of the preheated air leaving the fired heater 30. None of these three alternatives is shown in the drawing.

In the regenerator 11 the solids move downwardly, preferably as a discontinuous stream, and are met with a rising stream of air. Because the partial pressure of oxygen in the air is higher than the equilibrium partial pressure of oxygen over the solids (manganese dioxide), the manganic oxide content reacts with oxygen from the air to form manganese dioxide. As the solids move down through the regenerator and the reaction progresses, the exothermic heat of reaction causes the solids temperature to increase by about 50° F. to 70° F.

The nitrogen and unreacted oxygen are removed from the regenerator 11 and its cyclone separator (not shown) through line 33 and, after serving to heat fresh air in heat exchanger 29, are delivered to the spray cooler 34. In the spray cooler 34 the nitrogen is contacted with water introduced from line 35 through a series of spray nozzles. The nitrogen temperature is thereby reduced to between 100° F. and 200° F. At the same time the solids remaining entrained in the entering nitrogen are removed and form a thin slurry with the water, which is removed from the cooler 34 through line 36. The nitrogen is discharged from cooler 34 to the atmosphere through line 37.

The recovery of solids from the slurries flowing in lines 20 and 36 from the spray coolers 18 and 34 is open to considerable variation. In one variant, the slurry in line 20 is pumped into line 35 and becomes the water supply for spray cooler 34. By so doing the solids content of the slurry in line 20 is added to the solids removed from the nitrogen in spray cooler 34. Now the slurry leaving spray cooler 34 in line 36 contains all of the solids entrained in the gas streams from both reactor and regenerator. The combined slurry in line 36 is still relatively thin. It is filtered by conventional means and the recovered solids are returned to an appropriate point in the hot solids system of the reactor-regenerator. In another variant, an auxiliary spray cooler is installed in line 17 just ahead of cooler 18. Then, the auxiliary cooler and the nitrogen cooler 34 are each supplied with a restricted amount of water so that relatively thick (e.g. 20% by weight) slurries will form. The thick slurry streams are combined and subjected to filtration for solids recovery. The recovered solids are returned to the reactor-regenerator as noted above. The treatment of the slurries from lines 20 and 36 is not shown in the drawing.

In accordance with a preferred form of the invention contact between the solids and gases in the reactor and regenerator is made while the solids flow in a discontinuous stream countercurrent to the flow of gas. The design of apparatus in which this effect will be obtained is subject to considerable variation. One desirable arrangement is shown in FIG. 2.

Figure 2:
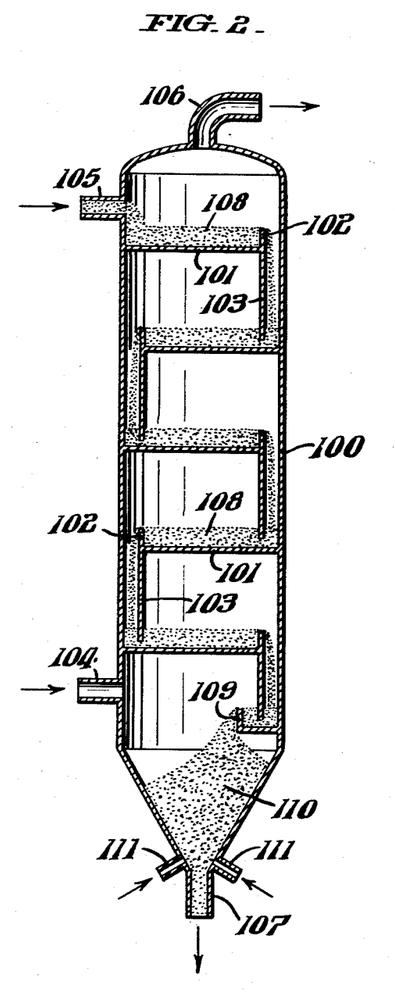
FIG. 2 is a schematic view in vertical section showing a preferred construction for a reactor or regenerator to be used in the process of FIG. 1.

Referring to FIG. 2, the reactor (or regenerator) comprises a cylindrical tower 100. A series of perforated plates or trays 101 is located one above the other along the length of the tower. An overflow weir 102 is placed at one edge of each tray and immediately below the weir there is a downcomer 103. The downcomer extends to a level below the top of the overflow weir on the next tray below. A gas inlet 104 is provided toward the bottom of the tower below the bottom tray and a solids inlet 105 is located toward the top of the tower above the top tray. A gas outlet 106 is placed at the top of the tower, and the extreme lower end of the tower, which is conical in shape, has a solids outlet 107.

In operation a stream of solids is delivered through duct 105 to the top tray of the series 101 and forms the first of a series of beds 108. Gas rising in the tower passes through the perforations in the tray and maintains the bed in a fluidized condition, leaving the tower through duct 106. As solids continue to flow through the inlet 105 they pass over the weir 102, flow down through the downcomer 103 and establish another fluidized bed on the next tray below. In like manner fluidized beds are established on each tray all the way down the series. The gas, which moves up through the perforations of succeeding trays to maintain the beds in a fluidized condition, is introduced below the bottom tray through duct 104. The solids from the bottom tray flow through the downcomer of that tray into a "seal pot" 109 which prevents gas from by-passing the tray via the downcomer. As the solids overflow from the "seal pot" 109 they fall into the conical bottom section of the tower and there form a bed 110. This bed is maintained in a free flowing condition (not necessarily fluidized) by means of an aeration gas introduced through ducts 111. Solids are withdrawn from the bed 110 through the solids outlet 107.

It will be understood that the number of trays shown in FIG. 2 is illustrative only and is not necessarily the number required by the process design conditions. Also, the same general construction may be used for both the reactor and the regenerator.

When the device is used either as a regenerator or a reactor the aerating gas introduced through lines 111 will preferably be steam or oxygen. In addition to maintaining the solids in bed 110 in a free flowing condition, the aerating gas may serve to strip entrained gases from the solids in the bed before they are discharged through outlet 107. This is particularly useful in the case of the regenerator because it prevents contamination of the product oxygen with nitrogen from the entrained air.

Instead of the arrangement shown in FIG. 2, the process may be conducted by means of a series of baffles. This variation is shown in FIG. 3.

Figure 3:
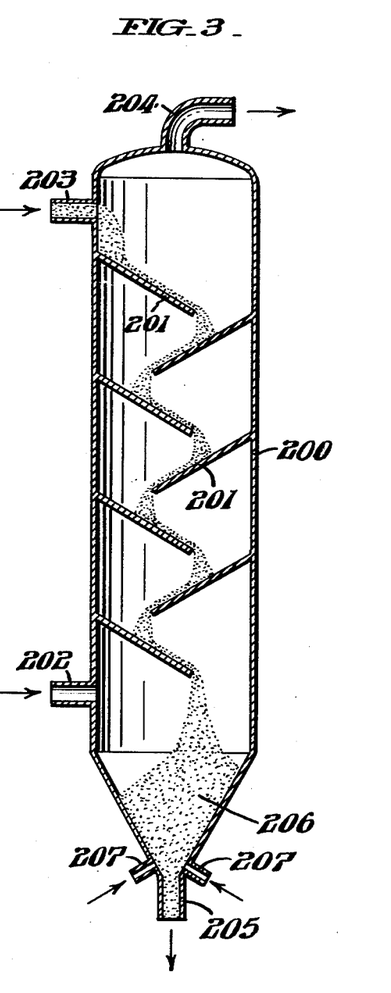
FIG. 3 is a schematic view in vertical section of an alternate form of a reactor or regenerator for use in the process of FIG. 1.

The apparatus of FIG. 3 comprises a cylindrical column 200. A series of alternately inclined baffle plates 201 is arranged inside the column. These baffle plates may be perforated or they may be imperforate. A gas inlet 202 is located near the bottom of the column below the lowermost baffle plate and a solids inlet 203 is provided near the top of the column above the uppermost baffle plate. A gas outlet 204 is placed at the top of the column and a solids outlet 205 is positioned at the lower end of the conical bottom of the column.

In operation solids are introduced through the duct 203 and fall onto the top baffle plate of the series 201. The solids slide down the plate and over the edge, falling as a curtain-like stream onto the next baffle plate below. This process is repeated from baffle to baffle down through the series, each baffle producing a curtain-like stream of solids. The gas to be contacted with the solids is introduced through the duct 202 and moves upwardly in the column passing through the curtain-like streams of solids in succession, leaving the column via duct 204. Passage of the gas through the cascading solids in this manner results in a high degree of agitation and very efficient gas-solids contacting. The solids falling from the bottom baffle in the series gather in the conically shaped bottom portion of the column forming a bed 206. This bed is maintained in a free flowing condition by the introduction of an aeration gas through lines 207. The solids are removed from the column through line 205.

As in the embodiment of FIG. 2, the device shown in FIG. 3 may be used as either reactor or regenerator. Also, the number of baffle plates shown in FIG. 3 is not necessarily the number required by process design conditions. It may be further pointed out that the reactor and regenerator need not be of identical design. It would be quite possible to use the design shown in FIG. 2 for the regenerator and the design of FIG. 3 for the reactor or vice versa.

The designs shown in FIG. 2 and FIG. 3 have been presented to illustrate the principles of gas-solids contact with the solids flowing as a discontinuous stream. The many possible variations in design and design details are well understood in the art and do not merit discussion here. For example, the solids inlet connections may be equipped with a variety of flow distributing devices; the solids flow across the fluid beds (FIG. 2) may be center-to-side rather than the side-to-side arrangement shown; the baffle plates (FIG. 3) may be set up in a disc-donut arrangement rather than alternately inclined as shown; and so on, all without interfering with the chief function of the device as a whole.

Both the reactor and the regenerator are equipped with cyclone separators in the gas outlets. The cyclones remove a large part of the solids entrained in the gas streams leaving the vessels, returning them to the main solids streams from which they were entrained. The cyclones may be mounted inside or outside the reaction vessels as desired. Such installations are so well standardized in the art of fluidized solids-gas handling that it is only necessary to mention the need for them here.

The invention will be further described by means of the following specific examples which are given for purposes of illustration only and are not to be taken as in any way restricting the invention beyond the scope of the appended claims.

*Example I*

Using the system shown in FIG. 1 of the drawings and with both the reactor and regenerator constructed in accordance with FIG. 2, 18,770 lbs./hr. of steam are supplied to line 12 at a temperature of 240° F. and a pressure of 10 p.s.i.g. The steam temperature is raised to 763° F. in heat exchanger 13 and further increased to 863° F. in fired heater 14. The 863° F. steam is delivered to the bottom of reactor 10 at a pressure of 6.9 p.s.i.g.

Approximately 900,000 lbs./hr. of manganese dioxide at a temperature of 870° F. are withdrawn from the regenerator 11 through line 15 being picked up by 588 lbs./hr. of steam introduced through line 16, and conveyed to the top of the reactor 10. The gas stream leaving the top of the reactor (and cyclone separator) through line 17 contains 8,330 lbs./hr. of oxygen, 19,358 lbs./hr. of steam and about 1,300 lbs./hr. of solids. It is at a temperature of 863° F. and a pressure of 0.2 p.s.i.g. and is cooled to 454° F. in heat exchanger 13. The mixture at 454° F. is fed to spray cooler 18 in which its temperature is reduced to 120° F. In order to do this 762,000 lbs./hr. of 90° F. cooling water are required, being introduced through line 19, and 18,752 lbs./hr. of steam are condensed. The 1,300 lbs./hr. of solids contained in the entering gas are removed and leave cooler 18 suspended in 780,752 lbs./hr. of water through line 20.

The gas leaving the spray cooler 18 through line 21 comprises 8,330 lbs./hr. of oxygen and 606 lbs./hr. of steam (water vapor). It is delivered to oxygen compressor 22 at 120° F. and at a pressure between 0 p.s.i.g. and 0.1 p.s.i.g. The oxygen compressor discharges the gas at 5 p.s.i.g. and 170° F. After cooling to 100° F. in cooler 23, the 8,330 lbs./hr. of oxygen, now containing 237 lbs./hr. of water vapor, is ready for delivery as product.

The air stream for regeneration introduced through line 26 into blower 27 contains 14,300 lbs./hr. of oxygen, 47,100 lbs./hr. of nitrogen and 1,280 lbs./hr. of water vapor (air assumed to be 50% saturated at 100° F.). In the blower the air is compressed to 4.7 p.s.i.g. and its temperature is raised to 146° F. The air from the blower 27 is conducted, via line 28 through heat exchanger 29 in which its temperature is raised to 650° F. and through fired heater 30 in which its temperature is further increased to 813° F., to the bottom of the regenerator 11. The air is delivered to the regenerator at a pressure of 4.2 p.s.i.g.

Approximately 890,000 lbs./hr. of solids (manganese dioxide containing 82,200 lbs./hr. of manganic oxide) at a temperature of 808° F. are withdrawn from the reactor 10 through line 31, being picked up by 327 lbs./hr. of steam introduced through line 32, and conveyed to the top of the regenerator 11. The gas stream leaving the top of the regenerator (and cyclone separator) through line 33 comprises 5,970 lbs./hr. of oxygen, 47,100 lbs./hr. of nitrogen, 1,607 lbs./hr. of water vapor (steam) and about 1,800 lbs./hr. of solids. This mixture is at a temperature of 813° F. and a pressure of about 0.1 p.s.i.g. It is cooled to 246° F. in heat exchanger 29 then delivered to spray cooler 34.

The water supply for cooler 34 is obtained from the oxygen cooler 18 by delivering the 780,752 lbs./hr. of water and 1,300 lbs./hr. of solids flowing in line 20 to a pump (not shown) which discharges into the line 35 feeding water to the nitrogen cooler 34. The gas stream fed to the cooler 34 is thereby cooled to 119° F. and 2,613 lbs./hr. of water are evaporated. The 1,800 lbs./hr. of solids contained in the entering gas stream are removed and leave cooler 34 along with the solids from line 20 and the remaining water through line 36.

The gas leaving cooler 34 through line 37 comprises 5,970 lbs./hr. of oxygen, 47,100 lbs./hr. of nitrogen and 4,220 lbs./hr. of water vapor. It is discharged to the atmosphere at a temperature of 119° F.

The 773,139 lbs./hr. of water and 3,100 lbs./hr. of solids leaving cooler 34 through line 36 are subjected to filtration (means not shown) and the recovered solids are returned to an appropriate point (bottom of regenerator) in the reactor-regenerator system by pneumatic transport or other suitable means.

In the example given above, the temperatures in the reactor and regenerator and the solids circulation rate are suitable for a particular sample of maganese dioxide. Other samples may require different temperatures and circulation rates as has been indicated previously. Under such conditions the air, steam, and oxygen product rates would be the same as before. The necessary modifications in the heat balances around heat exchangers 13 and 29, fired heaters 14 and 30, and coolers 18 and 34 will be readily understood and need no further amplification.

*Example II*

With conditions otherwise substantially identical to those given in Example I, the solids withdrawn from the regenerator 11 comprise approximately 120,000 lbs./hr. of manganese dioxide and 800,000 lbs./hr. of mill scale ($Fe_3O_4$), while the solids withdrawn from the reactor 10 comprises approximately 30,000 lbs./hr. of manganese dioxide and 800,000 lbs./hr. of mill scale along with 82,200 lbs./hr. of manganic oxide.

*Example III*

Again, as in Example I, using the system shown in FIG. 1 of the drawings and with both the reactor and regenerator constructed in accordance with FIG. 2, 45,800 lbs./hr. of carbon dioxide are supplied to line 12 at a temperature of 100° F. and a pressure of at least 7.5 p.s.i.g. The carbon dioxide temperature is raised to 763° F. in heat exchanger 13 and further increased to 863° F. in fired heater 14. The 863° F. carbon dioxide is delivered to the bottom of reactor 10 at a pressure of 6.9 p.s.i.g.

Approximately 900,000 lbs./hr. of manganese dioxide at a temperature of 870° F. are withdrawn from the regenerator 11 through line 15 being picked up by 588 lbs./hr. of steam introduced through line 16, and conveyed to the top of reactor 10. The gas stream leaving the top of the reactor (and cyclone separator) through line 17 contains 8,330 lbs./hr. of oxygen, 45,800 lbs./hr. of carbon dioxide, 588 lbs./hr. of steam and about 1,300 lbs./hr. of solids. It is at a temperature of 863° F. and a pressure of 0.2 p.s.i.g. and is cooled to 338° F. in heat exchanger 13. The mixture at 338° F. is fed to spray cooler 18 in which its temperature is reduced to 120° F. In order to do this 16,920 lbs./hr. of 90° F. cooling water are required, being introduced through line 19, and 2,442 lbs./hr. of water are evaporated. The 1,300 lbs./hr of solids contained in the entering gas are removed and leave cooler 18 suspended in 14,478 lbs./hr of water through line 20.

The gas leaving spray cooler 18 through line 21 comprises 8,330 lbs./hr. of oxygen, 45,800 lbs./hr. of carbon dioxide and 3,030 lbs./hr. of water vapor. It is delivered to compressor 22 at 120° F. and at a pressure between 0 p.s.i.g. and 0.1 p.s.i.g. The compressor discharges the gas at 5 p.s.i.g. and 170° F. After cooling to 100° F. in cooler 23, the gas may be used directly or it may be further compressed and, or treated for removal of carbon dioxide before delivery as product.

The air stream for regeneration introduced through line 26 into blower 27 contains 14,300 lbs./hr. of oxygen, 47,100 lbs./hr. of nitrogen and 1,280 lbs./hr. of water vapor (air assumed to be 50% saturated at 100° F.). In the blower the air is compressed to 4.7 p.s.i.g. and its temperature is raised to 146° F. The air from the blower 27 is conducted, via line 28 through heat exchanger 29 in which its temperature is raised to 650° F. and through fired heater 30 in which its temperature is further increased to 813° F., to the bottom of the regenerator 11. The air is delivered to the regenerator at a pressure of 4.2 p.s.i.g.

Approximately 890,000 lbs./hr. of solids (manganese dioxide containing 82,200 lbs./hr. of manganic oxide) at a temperature of 808° F. are withdrawn from the reactor 10 through line 31, being picked up by 327 lbs./hr. of steam introduced through line 32, and conveyed to the top of the regenerator 11. The gas stream leaving the top of the regenerator (and cyclone separator) through line 33 comprises 5,970 lbs./hr. of oxygen, 47,100 lbs./hr. of nitrogen, 1,607 lbs./hr. of water vapor and about 1,800 lbs./hr. of solids. This mixture is at a temperature of 813° F. and a pressure of about 0.1 p.s.i.g. It is cooled to 246° F. in heat exchanger 29 then delivered to spray cooler 34.

In the cooler 34 the gas is cooled to 110° F. by means of 13050 lbs./hr. of 90° F. cooling water introduced through line 35. In cooling the gas 1,588 lbs./hr. of water are evaporated and the 1,800 lbs./hr. of solids in the entering gas stream are removed, leaving cooler 34 suspended in 11,462 lbs./hr. of water through line 36. The gas leaving cooler 34 through line 37 comprises 5,970 lbs./hr. of oxygen, 47,100 lbs./hr. of nitrogen, and 3,195 lbs./hr. of water vapor. It is discharged to the atmosphere at a temperature of 110° F.

The 14,478 lbs./hr. of water and 1,300 lbs./hr. of solids leaving cooler 18 through line 20 are combined with the 11,462 lbs./hr. of water and 1,800 lbs./hr. of solids leaving cooler 34 through line 36. The combined stream is subjected to filtration (means not shown) and the recovered solids are returned to an appropriate point (bottom of regenerator) in the reactor-regenerating system by pneumatic transport or other suitable means.

*Example IV*

With the same air, steam and oxygen production rates and the system used in Example I, the material withdrawn from the regenerator 11 through line 15 consists of approximately 790,000 lbs./hr. of sodium manganate containing solids at a temperature of 1145° F. and comprising an air oxidized mixture of sodium hydroxide and manganese dioxide in which the molar ratio of sodium hydroxide to manganese dioxide is about 1.5. About 530 lbs./hr. of steam are introduced through line 16 to convey the solids through line 15 to the top of reactor 10. The gas stream leaving the top of the reactor (and cyclone separator) through line 17 contains 8,330 lbs./hr. of oxygen, 19,300 lbs./hr. of steam and about 1,300 lbs./hr. of solids. It is at a temperature of 1137° F. and a pressure of about 0.2 p.s.i.g. The 18,770 lbs./hr. of steam entering reactor 10 from line 12 is at a temperature of 1137° F. and a pressure of 6.9 p.s.i.g.

Approximately 780,000 lbs./hr. of solids (sodium manganate content partially reduced to sodium permanganite) at a temperature of 1073° F. are withdrawn from the reactor 10 through line 31, being picked up by about 270 lbs./hr. of steam introduced through line 32, and conveyed to the top of regenerator 11. The gas stream leaving the top of the regenerator (and cyclone separator) through line 33 contains 5,790 lbs./hr. of oxygen, 47,100 lbs./hr. of nitrogen, 1,550 lbs./hr. of water vapor (steam) and about 1,800 lbs./hr. of solids. This mixture is at a temperature of 1081° F. and a pressure of about 0.1 p.s.i.g. The 62,680 lbs./hr. of air entering regenerator 11 from line 28 is at a temperature of 1081° F. and a pressure of 4.2 p.s.i.g.

The heat balances around heat exchangers 13 and 29, fired heaters 14 and 30, and spray coolers 18 and 34 are straightforward with reference to the reactor-regenerator conditions outlined above and to the general terminal conditions given in Example I.

Because a substantial part of the circulating solids is quite soluble in water, the operation of the spray coolers 18 and 34 is modified in the following manner to prevent loss of soluble materials in the cooling water. An auxiliary spray cooler is located in line 17 just ahead of cooler 18. The auxiliary cooler and cooler 34 are each supplied with a restricted amount of water so that most of the gas cooling is effected by evaporation of part of the cooling water and relatively thick slurries are formed from the solids in the entering gas and the remaining water. The thick slurry streams are combined and subjected to filtration. The recovered solids are returned to an appropriate point (bottom of regenerator) in the reactor-regenerator system by pneumatic transport or other suitable means. The filtrate, a saturated solution of dissolved solids, is recycled to the auxiliary cooler and cooler 34, serving as the water supply therefor. Fresh make-up water is added to the cycle to provide for the loss by evaporation during the gas cooling. Under these conditions cooler 18 becomes primarily a condenser for the steam in the product oxygen.

This example illustrates the use of alkali manganates to produce oxygen. It will be understood that any of the alkali metal or alkaline earth metal manganates may be used if desired. Also, the ratio of alkali to manganese is open to considerable variation, satisfactory operation being obtained at OH to $MnO_2$ ratios between 0.5 and 2.5. As in the case of pure manganese dioxide, inert diluents (heat carriers) such as mill scale ($Fe_3O_4$) may be used with the magnanates. With some of the manganates, especially those having a high alkali to manganese ratio, the diluents may serve the desirable purpose of preventing agglomeration.

*Example V*

Using the air, steam and oxygen production rates and the system of Example I, the material withdrawn from the regenerator 11 through line 15 comprises approximately 3,500,000 lbs./hr. of solids consisting of 90% silica gel and 10% absorbed chromium trioxide at a temperature of 558° F. About 4,200 lbs./hr. of steam are introduced through line 16 to convey the solids through line 15 to the top of reactor 10. The gas stream leaving the top of the reactor (and cyclone separator) through line 17 contains 8,330 lbs./hr. of oxygen, 22,970 lbs./hr. of steam and about 1,500 lbs./hr. of solids. It is at a temperature of 555° F. and a pressure of about 0.2 p.s.i.g. The 18,770 lbs./hr. of steam entering reactor 10 from line 12 is at a temperature of 555° F. and a pressure of 6.9 p.s.i.g. If desired part or all of the steam flowing in line 12 may be used rather than fresh steam to transport the solids in line 15. In this case separation means are provided at the top of the reactor 10 so that the solids can be fed to the top of the reactor and the steam to the bottom.

Approximately 3,490,000 lbs./hr. of solids (silica gel and partially reduced chromium trioxide) at a temperature of 533° F. are withdrawn from the reactor 10 through line 31, being picked up by about 1,900 lbs./hr. of steam introduced through line 32, and conveyed to the top of regenerator 11. The gas stream leaving the top of the regenerator (and cyclone separator) through line 33 contains 5,970 lbs./hr. of oxygen, 47,100 lbs./hr. of nitrogen, 3,180 lbs./hr. of water vapor (steam) and about 1,900 lbs./hr. of solids. This mixture is at a temperature of 536° F. and a pressure of about 0.1 p.s.i.g. The 62,680 lbs./hr. of air entering regenerator 11 from line 28 is at a temperature of 536° F. and a pressure of 4.2 p.s.i.g. If desired part of the air flowing in line 28 may be used rather than steam to transport the solids in line 31. In this case separation means are provided at the top of the regenerator 11 so that the solids can be fed to the top of the regenerator and the air to the bottom.

The heat balances around heat exchangers 13 and 29, fired heaters 14 and 30, and spray coolers 18 and 34 are made in a normal manner with reference to the reactor-regenerator conditions outlined above and to the general terminal conditions given in Example I.

Chromium trioxide is very soluble in water. Because of this the operation of the spray coolers 18 and 34 is modified in the same manner as was described in Example IV to prevent loss of soluble material in the cooling water.

In this example, the silica gel is an inert material in terms of oxygen production, but it performs several necessary functions. It serves as a mechanical carrier for the chromium trioxide; it acts as a heat carrier; and most importantly it serves to chemically stabilize the chromium trioxide, which in the pure state tends to be reduced all the way to chromic oxide ($Cr_2O_3$) and cannot be regenerated. The amount of chromium trioxide absorbed by the silica gel may be varied between about 5% and about 15% or more as desired.

*Example VI*

Again with the same air, steam and oxygen production rates and the system used in Example I, the material withdrawn from the regenerator 11 through line 15 consists of approximately 1,690,000 lbs./hr. of solids at a temperature of 1005° F. and comprising about 480,000 lbs./hr. of red lead ($Pb_3O_4$) and about 1,210,000 lbs./hr. of mill scale ($Fe_3O_4$). About 930 lbs./hr of steam are introduced through line 16 to convey the solids through line 15 to the top of reactor 10. The gas stream leaving the top of the reactor (and cyclone separator) through line 17 contains 8,830 lbs./hr. of oxygen, 19,700 lbs./hr. of steam and about 1,300 lbs./hr. of solids. It is at a temperature of 998° F. and a pressure of about 0.2 p.s.i.g. The 18,770 lbs./hr. of steam entering reactor 10 from line 12 is at a temperature of 998° F. and a pressure of 6.9 p.s.i.g.

Approximately 1,680,000 lbs./hr. of solids at a temperature of 948° F., and comprising about 350,000 lbs./hr. of lead oxide (PbO), about 120,000 lbs./hr. of red lead ($Pb_3O_4$) and about 1,210,000 lbs./hr. of mill scale ($Fe_3O_4$), are withdrawn from the reactor 10 through line 31. The solids are picked up by about 530 lbs./hr. of steam introduced through line 32 and conveyed to the top of regenerator 11. The gas stream leaving the top of the regenerator (and cyclone separator) through line 33 contains 5,970 lbs./hr. of oxygen, 47,100 lbs./hr. of nitrogen, 1,810 lbs./hr. of water vapor (steam) and about 1,800 lbs./hr. of solids. This mixture is at a temperature of 954° F. and a pressure of about 0.1 p.s.i.g. The 62,680 lbs./hr. of air entering regenerator 11 from line 28 is at a temperature of 954° F. and a pressure of 4.2 p.s.i.g.

The heat balances around heat exchangers 13 and 29, fired heaters 14 and 30, and spray coolers 18 and 34 are straightforward with reference to the reactor-regenerator conditions outlined above and to the general terminal conditions given in Example I.

In this example, the active agent ($Pb_3O_4$) is mixed with an inert material ($Fe_3O_4$). The inert material is used for two reasons. First, the $Fe_3O_4$ has about four times the heat capacity of $Pb_3O_4$ and its use results in a solids circulation rate which is about one third that required with $Pb_3O_4$ alone. In the second place, $Pb_3O_4$ is often so finely and uniformly divided that fluidization is difficult, but when mixed with a relatively large proportion of material such as $Fe_3O_4$ which can be sized for proper fluidizing characteristics, the mixture can be fluidized readily and easily.

*Example VII*

Using the air, steam and oxygen production rates and the system of Example I, the material withdrawn from the regenerator 11 through line 15 comprises approximately 1,800,000 lbs./hr. of copper oxychloride at a temperature of 1131° F. About 1,100 lbs./hr. of steam are introduced through line 16 to convey the solids through line 15 to the top of reactor 10. The gas stream leaving the top of the reactor (and cyclone separator) through line 17 contains 8,330 lbs./hr. of oxygen, 19,870 lbs./hr. of steam and about 1,300 lbs./hr. of solids. It is at a temperature of 1124° F. and a pressure of about 0.2 p.s.i.g.

The 18,770 lbs./hr. of steam entering reactor 10 from line 12 is at a temperature of 1124° F. and a pressure of 6.9 p.s.i.g.

Approximately 1,790,000 lbs./hr. of solids (partially reduced copper oxychloride) at a temperature of 1070° F. are withdrawn from the reactor 10 through line 31, being picked up by about 590 lbs./hr. of steam introduced through line 32, and conveyed to the top of regenerator 11. The gas stream leaving the top of the regenerator (and cyclone separator) through line 33 contains 5,970 lbs./hr. of oxygen, 47,100 lbs./hr. of nitrogen, 1,870 lbs./hr. of water vapor (steam) and about 1,800 lbs./hr. of solids. This mixture is at a temperature of 1077° F. and a pressure of about 0.1 p.s.i.g. The 62,680 lbs./hr. of air entering regenerator 11 from line 28 is at a temperature of 1077° F. and a pressure of 4.2 p.s.i.g.

The heat balances around heat exchangers 13 and 29, fired heaters 14 and 30, and spray coolers 18 and 34 are made in a normal manner with reference to the reactor-regenerator conditions outlined above and to the general terminal conditions given in Example I.

Copper oxychloride is a material of variable composition, depending upon the conditions under which it is made. The composition is normally represented by the formulas $CuCl_2 \cdot CuO$, $CuCl_2 \cdot 2CuO$, and $CuCl_2 \cdot 3CuO$. Other compositions have also been identified. The production of oxygen by copper oxychloride is illustrated by the equation:

$$CuCl_2 \cdot CuO \rightleftarrows 2CuCl + \tfrac{1}{2}O_2$$

In the foregoing examples, the use of a number of different oxygen producing materials in the process of this invention has been given in some detail. There are other materials which may also be used in the process although they have certain inherent disadvantages. Some of these are discussed below.

Barium peroxide ($BaO_2$) will produce oxygen in accordance with this process while the solids cycle through the reactor-regenerator system at temperatures between 1290° F. and 1380° F. However, the normally preferred steam or carbon dioxide, used as inert gas in the reactor, both react very energetically with barium oxides to form the hydroxide and carbonate respectively neither of which will produce oxygen. For the same reason carbon dioxide and moisture must be carefully removed from the regeneration air.

Copper oxide (CuO) also will produce oxygen by this process with the solids circulating through the reactor-regenerator system at temperatures between 1798° F. and 1892° F. The primary disadvantage in this material lies in the high operating temperature required. Such high temperatures make for expensive apparatus and a copper oxide process would have difficulty competing economically with a manganese dioxide process for example which operates at much lower temperatures.

Included among the various oxygen producing materials which may be used in the process of this invention are certain organic compounds. Typical of one group of such compounds is rubene [1] ($C_{18}H_{12}$) and its derivatives, solutions of which absorb oxygen at room temperature and release it again on heating. These materials would be used in the process at temperatures between about 100° F. and about 300° F.

A number of the so-called coordination compounds (metal organic complexes) may also be used in the process as they too have the ability to absorb oxygen from the air, releasing it again when heated to a higher temperature. The chelates, which comprise one of the major classes of coordination compounds are particularly important in this respect because many of them have been produced synthetically and several show the required characteristic absorption and desorption of oxygen. The chelates are solid materials, usually water soluble, and would be used in the process at temperatures between about 100° F. and about 400° F.

The use of organic oxygen producing compounds in the process of this invention has not been emphasized or given in great detail primarily because such use is potentially dangerous, especially on a large scale. It will be remembered that, fundamentally, the process involves the high efficiency contacting of an oxygen producing material with gases of relatively high oxygen content (e.g. air). The use of organic materials under such conditions presents serious fire or explosion hazards and is not generally recommended. Because of this the rather questionable chemical or mechanical stability of some of these organic oxygen producing compounds is of secondary importance.

It will be understood that many variations are possible in the specific systems which have been described and shown. A number of these variations have been noted in the foregoing discussions, some of them without particular definition. For example, other methods than the pneumatic systems described may be used to transport solids from one vessel to another. These would include such mechanical devices as the bucket conveyor.

The process of this invention may be operated with a wide variety of oxygen producing materials. The specific examples have included oxygen compounds of elements from groups I, IV, VI and VII of the periodic table of elements. Operation is also possible, but less advantageous, with oxygen compounds of certain other elements in the groups given above and with certain elements from groups II, III, V and VIII. In addition, except for the fire or explosion hazards involved, a number of organic oxygen producing compounds may also be used in the process.

I claim:

1. In a process for the production of oxygen the steps which comprise establishing a stream of oxygen-containing material selected from the group of oxygen-containing materials which release oxygen when heated and reabsorb oxygen from air at a lower temperature, introducing said material into a reaction zone at about atmospheric pressure and at about the temperature at which said material releases oxygen into the air at atmospheric pressure, bringing said stream into counter-current contact with a stream of an inert gas in said reaction zone to initiate an oxygen release reaction therein, adjusting the relative rates of counterflow of said streams of oxygen-containing material and said inert gas to limit said oxygen release reaction of said oxygen-containing material and establish a temperature gradient in said stream of oxygen-containing material decreasing in the direction of flow thereof and extending through a range of not less than about 25° F. and not more than about 95° F., and to maintain a partial pressure of oxygen in said inert gas at every point in the stream thereof which is less than the partial pressure of oxygen exerted by said oxygen-containing material at the corresponding contiguous point thereof, said partial pressure of oxygen in said stream of inert gas increasing in the direction of flow thereof, separating the mixture of inert gas and product oxygen from the oxygen-containing material, removing said mixture from said reaction zone and recovering the product oxygen.

2. The process defined in claim 1 wherein said stream of partially oxygen depleted oxygen-containing material is passed from said reaction zone into a regeneration zone at about atmospheric pressure and at about the temperature at which said oxygen-containing material leaves said reaction zone, bringing said stream of oxygen-containing material into counter current contact with a stream of air to initiate an oxygen absorption reaction therein, adjusting the relative rates of counterflow of

---

[1] Structure of rubene:

said streams of oxygen-containing material and said air to establish a temperature gradient in said stream of oxygen-containing material increasing in the direction of flow thereof and extending through a range of not less than about 25° F. and not more than about 95° F., and to maintain a partial pressure of oxygen in said air which is greater at every point in the stream thereof than the partial pressure of oxygen exerted by said oxygen-containing material at the corresponding contiguous point thereof, said partial pressure of oxygen in said stream of air decreasing in the direction of flow thereof, separating the partially oxygen depleted air from said oxygen-containing material and then re-introducing said oxygen-containing material into said reaction zone at substantially the same temperature at which said oxygen-containing material leaves said regeneration zone.

3. The process defined in claim 2 wherein said oxygen-containing material is a solid in finely divided form.

4. The process defined in claim 3 wherein said oxygen-containing material is manganese dioxide and wherein the temperature at which said material is introduced into said reaction zone is between about 600° F. and about 1200° F.

5. The process defined in claim 3 wherein said oxygen-containing material is an alkali metal or alkaline earth metal manganate comprising an air oxidized mixture of alkali metal or alkaline earth metal hydroxide and manganese dioxide in which the molal ratio of hydroxyl to manganese dioxide is between about 0.5 to 1 and about 2.5 to 1, the inert gas is steam, and the temperature at which the manganate is brought into contact with the steam is between about 900° F. and about 1200° F.

6. The process defined in claim 3 wherein said oxygen-containing material is silica gel containing between 5% and 15% of absorbed chromium trioxide, and the temperature at which the silica gel-chromium trioxide is brought into the reaction zone is between about 500° F. and about 600° F.

7. The process defined in claim 3 wherein said oxygen-containing material is red lead ($Pb_3O_4$) containing between none and about 2.5 times its own weight of admixed finely divided mill scale ($Fe_3O_4$), and the temperature at which the red lead enters the reaction zone is between about 800° F. and about 1100° F.

8. The process defined in claim 3 wherein said oxygen-containing material is copper oxychloride, and the temperature at which the copper oxychloride enters the reaction zone is between about 900° F. and about 1200° F.

9. The process defined in claim 2 wherein said oxygen-containing material is comprised in a liquid solution which is moved through a series of gas-liquid contacting trays counter-current to a stream of steam.

10. The process defined in claim 2 wherein said inert gas is selected from the groups consisting of steam and carbon dioxide.

References Cited in the file of this patent

UNITED STATES PATENTS

| | | |
|---|---|---|
| 70,705 | Du Motay | Nov. 12, 1867 |
| 2,217,850 | Warne et al. | Oct. 15, 1940 |
| 2,418,402 | Gorin | Apr. 1, 1947 |
| 2,490,587 | Fontana | Dec. 6, 1949 |
| 2,716,587 | Hillard | Aug. 30, 1955 |
| 2,783,134 | Hughes et al. | Feb. 26, 1957 |

FOREIGN PATENTS

| | | |
|---|---|---|
| 628,572 | Great Britain | Aug. 23, 1946 |

UNITED STATES PATENT OFFICE
CERTIFICATE OF CORRECTION

Patent No. 3,121,611                          February 18, 1964

Almon S. Parker

It is hereby certified that error appears in the above numbered patent requiring correction and that the said Letters Patent should read as corrected below.

Column 1, line 47, for "$Na_2MnO_4+H_2 \rightleftarrows 2NaOH+\frac{1}{2}O_2+MnO_2$" read -- $Na_2MnO_4+H_2O \rightleftarrows 2NaOH+\frac{1}{2}O_2+MnO_2$ --; column 4, line 18, for "steam--" read -- steam= --; column 16, line 40, for "molar" read -- molal --; line 58, for "5790" read -- 5970 --; column 18, line 25, for "8830" read -- 8330 --.

Signed and sealed this 7th day of July 1964.

(SEAL)
Attest:

ERNEST W. SWIDER                                  EDWARD J. BRENNER
Attesting Officer                                      Commissioner of Patents